United States Patent [19]

Monty

[11] Patent Number: 5,308,101
[45] Date of Patent: May 3, 1994

[54] ELASTICALLY RETRACTABLE AUTOMOBILE TOWING STRAP

[75] Inventor: Chuck Monty, Milwaukee, Wis.

[73] Assignee: Monty Corp., Houston, Tex.

[21] Appl. No.: 916,891

[22] Filed: Jul. 20, 1992

[51] Int. Cl.⁵ .............................................. B60D 1/18
[52] U.S. Cl. ................................ 280/480.1; 280/480; 267/74
[58] Field of Search ............ 280/480, 480.1, 483; 294/74, 82.11, 82.16; 403/41, 284; 267/73, 74

[56] References Cited

U.S. PATENT DOCUMENTS

| | | | |
|---|---|---|---|
| 1,473,211 | 11/1923 | Cowles | 280/480 |
| 1,574,552 | 2/1926 | Chapman | 280/480 |
| 1,587,426 | 6/1926 | Schwier | 280/480 |
| 1,599,353 | 9/1926 | Albin | 280/480 |
| 1,695,096 | 12/1928 | Hanses | 280/480 |
| 2,670,951 | 3/1954 | Lucky | 280/480 |
| 2,714,019 | 7/1955 | Williams et al. | 280/480 |
| 2,878,013 | 3/1959 | Piodi | 280/480 |
| 2,991,524 | 7/1961 | Dobrikin | 267/69 |
| 3,306,600 | 2/1967 | Roux | 267/74 |
| 3,869,114 | 3/1975 | Schneider | 267/69 |
| 3,931,656 | 1/1976 | Thomson | 9/310 E |
| 4,446,653 | 5/1984 | Morgan, Jr. | 49/67 |
| 5,113,981 | 5/1992 | Lantz | 267/74 |

FOREIGN PATENT DOCUMENTS

| | | | |
|---|---|---|---|
| 257774 | 3/1913 | Fed. Rep. of Germany | 267/74 |
| 18713 | 9/1928 | Netherlands | 267/73 |

Primary Examiner—Robert J. Oberleitner
Assistant Examiner—Clifford T. Bartz
Attorney, Agent, or Firm—Nilles & Nilles

[57] ABSTRACT

An elastically retractable towing strap used for towing one vehicle with another vehicle is disclosed. A first strap of elastic material, encased in a sleeve of woven fabric material, is connected to a second strap of a woven fabric towing line. The ends of the elastics strap are connected to the ends of the fabric towing line by weaving the elastic strap through a double loop connector, and riveting the connector to the fabric towing line. Further, the sleeve, which encases the elastic strap, is connected to the fabric towing line at a number of points along the length thereof. The sleeve may also serve the dual purpose of both encassing the elastic strap and functioning as the towing strap.

7 Claims, 2 Drawing Sheets

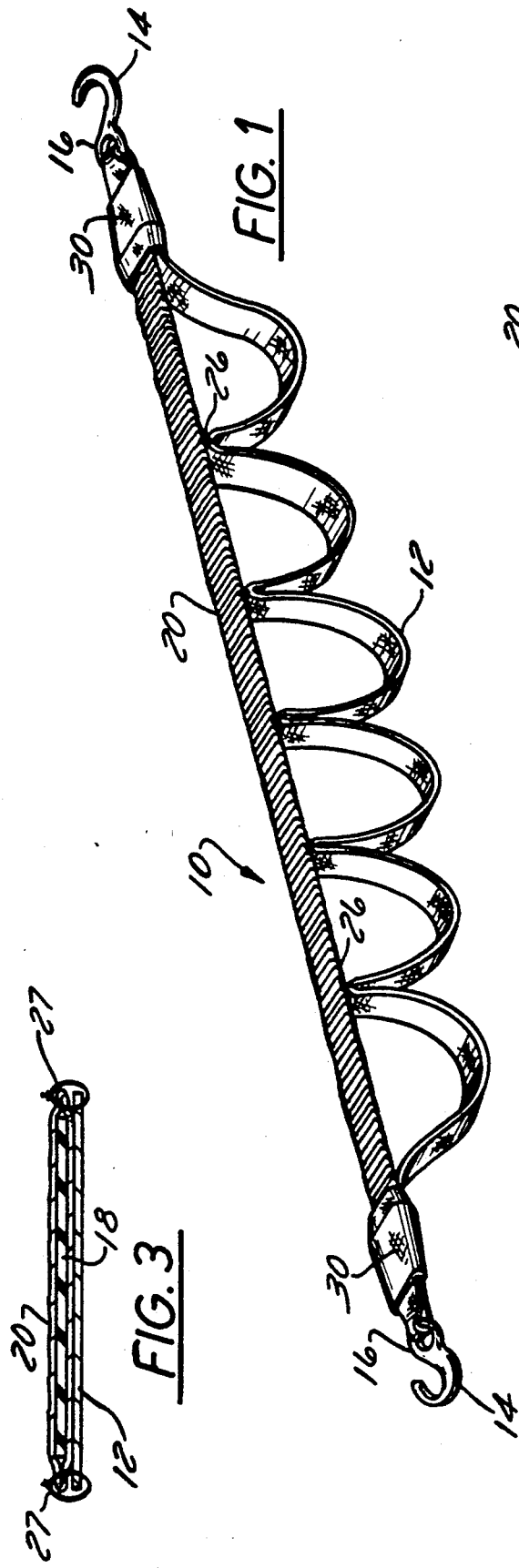
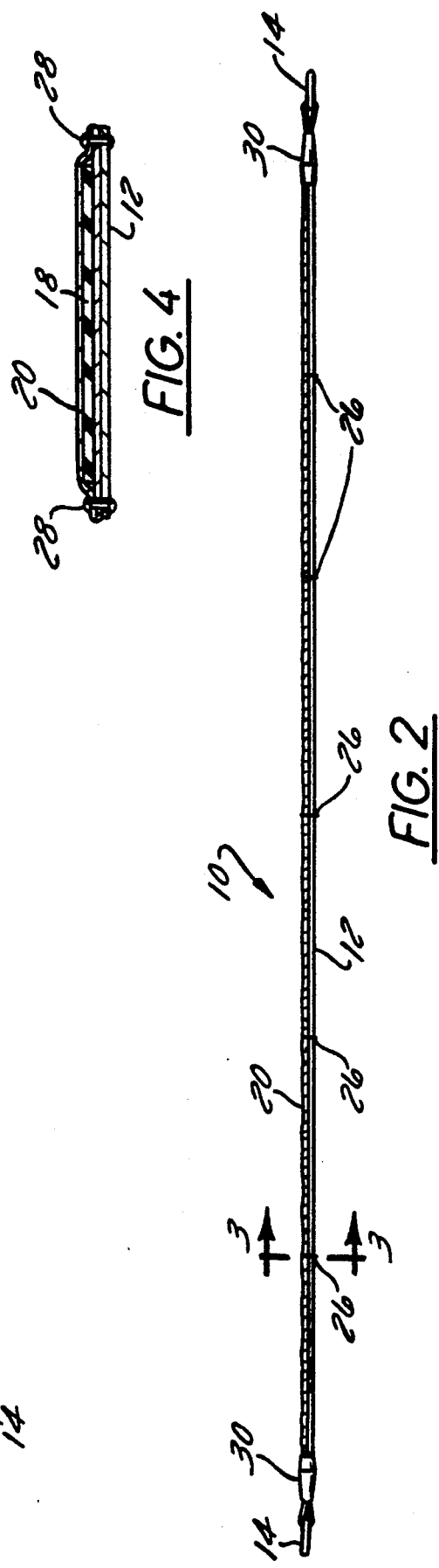

ELASTICALLY RETRACTABLE AUTOMOBILE TOWING STRAP

BACKGROUND OF THE INVENTION

This invention relates to a towing strap including an elastic material for retracting the strap to prevent damage to vehicles being towed or doing the towing.

A disabled automobile, vehicle or cycle can often be towed to another location by a second automobile for repairs or disposal, etc. This is accomplished by connecting a towing line or towing strap from the rear bumper or frame of the non-disabled vehicle to the front bumper or frame of the disabled vehicle. The non-disabled vehicle is thus able to pull the disabled vehicle to a service station or other location to repair or disposal of the disabled vehicle. This towing operation requires two drivers—one for the non-disabled vehicle and one for the disabled vehicle—who must closely coordinate their driving of the vehicles.

While the first vehicle is actually pulling the second, the towing line or strap is stretched tight between the two vehicles. However, when the first vehicle comes to a stop, or when it slows down to turn a corner, the second vehicle has a tendency to move closer to the first thereby causing the towing line to slacken. If the towing line slackens enough, it may drag on the roadway, catch against potholes or other sharp ridges in the road, become entangled underneath one of the vehicles, or when the vehicles are turning become caught under one of the tires. Such events may cause further damage to one or both of the vehicles. It is therefore desirable to provide a retractable towing line to prevent the possibility of such damage.

Previous efforts to provide a retractable towing line have typically been in the form of a retractable reel. For instance, U.S. Pat. No. 1,574,552 to Chapman shows a towing line mounted in a revolvable drum having a rewinding spring. U.S. Pat. No. 1,473,211 to Cowles shows a towing device comprising a spool upon which is coiled a flexible elastic band or metal strip. U.S. Pat. No. 1,695,096 to Hanses shows a vehicle towing device including a flat steel strap of some resiliency wound on a spool. U.S. Pat. No. 2,714,019 to Williams et al. discloses towing cables on a winding drum.

Other examples of towing lines include U.S. Pat. No. 1,599,353 to Albin which shows a vehicle tow chain combined with a heavy rubber fabric in the middle section to absorb sudden strains on the chain. U.S. Pat. No. 2,878,013 to Piodi shows a jerk absorber for tow ropes to absorb sudden strains on the rope. U.S. Pat. No. 3,869,114 to Schneider also shows a towing rope having a tension-cushioning shock absorber. U.S. Pat. No. 2,670,951 shows a towing gear with a heavy-duty spring. These devices, however, have a relatively low amount of elasticity, and are intended merely as shock absorbers to cushion the strain on the line. The devices do not prevent a slackened line from becoming entangled beneath the vehicles or other hazards.

SUMMARY OF THE INVENTION

An elastically retractable towing strap used for towing one vehicle, such as an automobile, cycles or other vehicle, with a second vehicle is disclosed. The device includes a length of towing strap, such as a heavy-duty, woven nylon fabric material with attachment means such as heavy-duty hooks connected to each end. The device further includes a length of elastic strap material, with each end of the elastic strap material connected to each end of the strap of fabric material, respectively. The elastic strap material is further supported by the fabric material along the length of the two straps. The strap of elastic material may be further encased in a sleeve of nylon woven fabric or other encasement, with the sleeve either forming the strap of fabric material or being directly connected at a number of points along the length of the strap of fabric material, such that the elastic material slips within the sleeve as the towing strap is extended and retracted.

The elastic strap material may be alternatively connected to the fabric towing strap through a number of rivets, eyelets or plastic holders to connect the two straps at various points along their length. Further, the elastic strap material may be connected directly to each end of the fabric towing strap, respectively, and fastened together by a number of loop members for slidingly connecting the fabric towing strap to the elastic strap, comparable to the slip movement of the elastic strap within the sleeve.

The primary object of the invention is therefore to provide an elastically retractable towing strap to be used by a non-disabled vehicle to tow a disabled vehicle such that the length of the strap will extend and retract in response to the changing distance between the two cars; to effectively combine a towing line or strap with a strip of elastic material for suitably retracting the towing line when slackened; and to provide a towing line or towing strap which will reduce or even eliminate the chance of becoming entangled beneath the two vehicles during towing operations. Other objects and advantages of the invention will become apparent from the following description taken in connection with the accompanying drawings which set forth, by way of illustration and example, certain preferred embodiments of the invention.

BRIEF DESCRIPTION OF THE DRAWINGS

The drawings, which constitute a part of the specification and include exemplary embodiments of the present invention, include the following:

FIG. 1 is a perspective view of an elastically retractable towing strap, with the elastic strap materials encased in a sleeve, and the edges of the sleeve attached to the edges of the towing strap.

FIG. 2 is a side view of the elastically retractable towing strap in the fully extended position.

FIG. 3 is a cross-section view taken at line 3—3 of FIG. 2 showing plastic loop-type fasteners for connecting the sleeve to the edges of the towing strap.

FIG. 4 is also a cross-section view showing rivets as an alternative means for connecting the sleeve to the towing strap.

DESCRIPTION OF THE PREFERRED EMBODIMENTS

Figure 5:
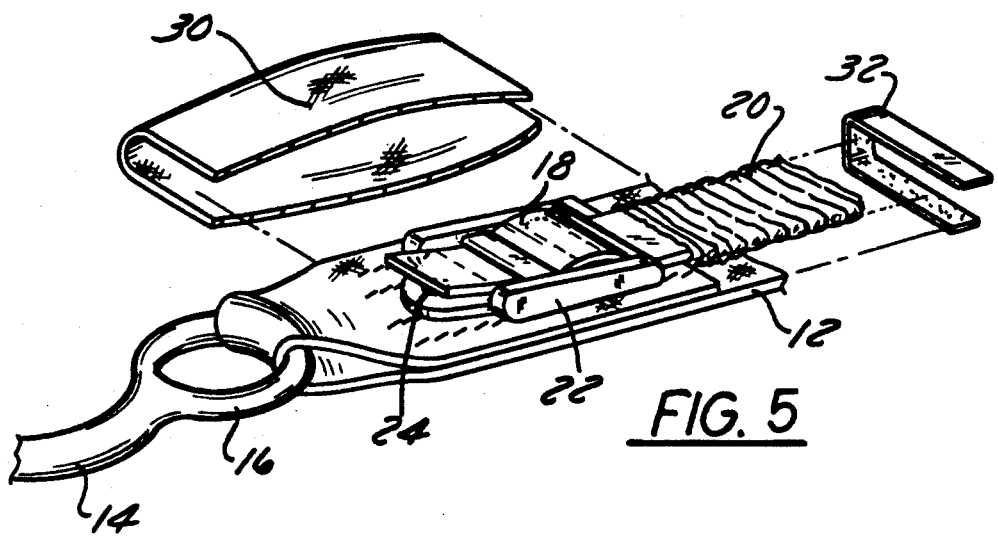
FIG. 5 is a partial perspective view showing the connection of the elastic strap material to the end portion of the towing strap.
Figure 6:
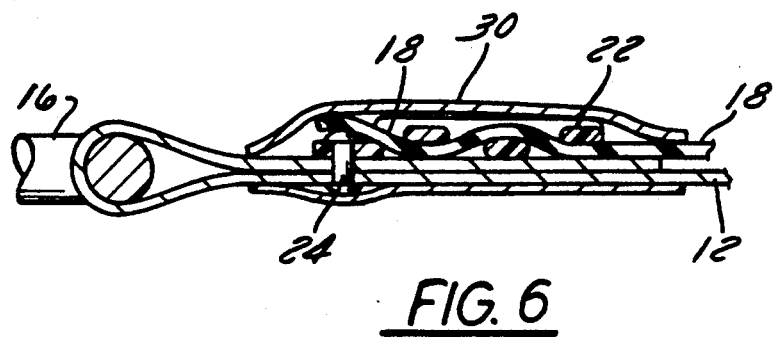
FIG. 6 is a partial cross-section view showing the connection of the elastic strap material to the end portion of the towing strap.
Figure 7:
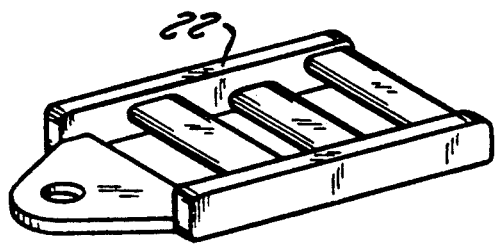
FIG. 7 is a perspective view of the double loop connector used to connect the elastic strap material to the end portion of the towing strap as shown in FIGS. 5 and 6.
Figure 8:
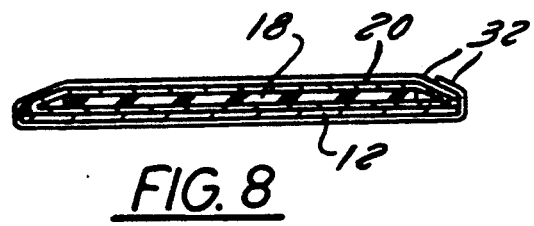
FIG. 8 is a cross-section view showing an alternative method of connecting the elastic strap to the towing strap with an adhesive strip.

An automobile towing strap 10 used for towing a car, cycle or other type of vehicle with a second vehicle comprises a heavy-duty towing line 12 made from a long strap of woven nylon of optional length. A heavy-duty hook 14, with a looped end 16, is connected to each end of the heavy-duty line 12 by inserting the end of the heavy-duty line 12 through the looped end 16, folding the end of the heavy-duty line 12 back over itself and sewing the two layers of fabric material together. The heavy-duty line 12 may alternatively be provided with a looped-type end which can be secured to vehicles. The retractable strap 10 further comprises a length of elastic material 18, such as natural rubber, supported by heavy-duty line of fabric material 12. The length of heavy-duty nylon fabric 12 is substantially longer than the non-stretched length of the elastic material strap 18, preferably at a ratio of at least three to one.

The ends of the elastic strap 18 are firmly connected to the end portion of the heavy-duty nylon fabric 12. It is important that the connection be strong enough to hold the two straps together when they are both fully extended as shown in FIG. 2, at which point the elastic strap 18 is exerting its greatest retraction force. However, the connection must be made with a minimum of puncturing of the heavy-duty nylon strap 12 so as not to compromise the integrity of the nylon strap. The connection also must not puncture or otherwise compromise the integrity of the elastic strap 18. Puncturing in the straps will quickly lead to breakage of the towing line, perhaps on the very first towing operation.

In one embodiment shown in FIGS. 1 and 2, the elastic strap is placed within a tube or sleeve 20 of fabric material, also woven nylon. The ends of the elastic strap 18 and the sleeve 20 are wound through two double-loop fasteners 22. Each double loop fastener 22 is firmly fastened to a respective end of the fabric nylon towing strap 12 with rivets 24 which protrude through the weaving of the material 12 and therefore do not cut the nylon material 12. Further, the edges of the sleeve 20 are connected at a number of spaced points 26 along the length of the nylon fabric towing strap. Again, it is important that the integrity of the nylon towing strap 12 not be compromised. The connections may be made with plastic loop connector 27 or alternatively with small rivets 28 in which the stems protrude through the web of the nylon towing strap 12 but do not cut the nylon material itself. Within a sleeve 20, when the towing strap 10 is fully extended and then slackened, the elastic strap 18 material slidably moves within the sleeve 20.

The end portions of the towing strap 10 may also be covered with a sleeve section 30 of sturdy material such as leather in order to protect the elastic material 18 and the heavy-duty fabric 12 from sharp edges and other abrasive surfaces, such as the edge of a car bumper.

Another method of connecting the elastic strap material may be made by using a series of loop members connected along the length of the nylon fabric towing strap and wrapped around the elastic strap. Again, comparable to the sleeve, the elastic strap material is free to move within the loops as the towing strap is extended and retracted between the two vehicles.

Another method of connecting the fabric and nylon straps may be through the use of a series of adhesive strips 32 wrapped around the two straps at a number of point along their length. The adhesive strip 32 is applied when the elastic strap is extended, or at least the portion of which the adhesive strip 32 is applied against is stretched, and the adhesive will crinkle when the elastic strap is released. If the adhesive strip were to be applied when the elastic strap was in the unstretched mode, then the elastic would later pull away from the adhesive strip when it was indeed stretched during a towing operation.

Other means for connecting the elastic strap and the nylon fabric towing strap may be employed, so long as the two straps are connected at a sufficient number of points so that when the nylon towing strap is slackened it is less likely to drag on the ground or become caught beneath the vehicles. Therefore, specific structural and functional details disclosed above are not to be interpreted as limiting the invention, but are merely a basis for the claims and for teaching one skilled in the art to variously employ the present invention in any appropriate detailed structure. Changes may be made in details of the construction of the invention without departing from its spirit, especially as defined in the following claims.

What is claimed is:

1. An automobile towing strap used for towing a first vehicle with a second vehicle comprising:

a length of strap of heavy-duty fabric material;

a first hook connected to a first end of the strap of fabric material for hooking said first end to said first vehicle and a second hook connected to a second end of the strap of fabric material for hooking said second end to said second vehicle with the fabric material being looped through an eyelet on each hook and the fabric material being folded over and fastened to itself;

a length of elastic strap material, which in its non-stretched state is substantially shorter than the length of the strap of fabric material and when fully stretched is approximately equal to the length of the strap of fabric material;

a first end of the elastic material connected by a first double loop fastener to the first end of the length of the strap of fabric material and a second end of the elastic material connected by a second double loop fastener to the second end of the length of the strap of fabric material;

a sleeve of fabric material extending from the first end to the second end of the length of the strap with only the elastic material being slidably enclosed within the sleeve;

the sleeve being connected at a number of spaced points along the length of the strap of fabric material such that the strap of fabric material and the strap of elastic material and the sleeve are cooperatively attached whereby when said first vehicle is being towed by said second vehicle that the strap of fabric material and the strap of elastic material and the sleeve are fully extended, and whereby in the event that said first vehicle moves closer to said second vehicle than the length of the strap of fabric material then the strap of elastic material elastically retracts and concurrently bunches the strap of fabric material and sleeve to prevent the towing strap from striking a road surface and to prevent the towing strap from becoming entangled underneath either said first or second vehicle.

2. The towing strap according to claim 1, wherein each end of the elastic material is connected to each end of the strap of fabric material, respectively, by double loop members riveted to the strap of fabric material.

3. The towing strap according to claim 2, further comprising a sturdy cover over the end portions of the towing strap.

4. The towing strap according to claim 1, further comprising a number of rivets along the length of the towing strap placed through the weaving of the edge of the sleeve and the edges of the strap of fabric material.

5. The towing strap according to claim 1, with the strap of fabric material and the sleeve being connected by a plurality of adhesive strips, with each strip being placed around and compressed against the strap of fabric material and the sleeve.

6. The towing strap according to claim 1, wherein both the fabric material and the sleeve comprise woven nylon.

7. The towing strap according to claim 1, wherein the elastic material comprises natural rubber.

* * * * *